Jan. 11, 1927.  
W. H. ROBISON  
1,614,394  
COMBINED FEEDER AND WATERER FOR POULTRY  
Filed Dec. 18, 1925   2 Sheets-Sheet 2

Inventor  
W. H. Robison.  
By Clarence A. O'Brien  
Attorney

Patented Jan. 11, 1927.

1,614,394

UNITED STATES PATENT OFFICE.

WILLIAM H. ROBISON, OF SPARTA, ILLINOIS.

COMBINED FEEDER AND WATERER FOR POULTRY.

Application filed December 18, 1925. Serial No. 76,296.

This invention relates to feeding and watering devices for poultry, and has for its primary object to produce a combination feeder and waterer that is relatively simple and inexpensive in construction.

The primary object of the invention is to provide a combined feeder and waterer for poultry that is equipped with means for preventing freezing of the feed and water during the cold months and wherein a large amount of feed and water may be stored for obviating the requirement of replenishing the feed and water every day.

A further and important object of the invention is to provide a device of this character that may be readily disassembled for cleaning, repair, renewal, or storage purposes, and wherein the same is of such construction as to receive a large supply of feed and water.

A still further and important object is to provide a device that may be readily supported upon the floor or ground, or supported upon rafters within the hen house.
With the foregoing and other objects in view as the nature of the invention will be better understood it will be seen that the same comprises the novel form, combination, and arrangement of parts hereinafter more fully described, shown in the accompanying drawings and claimed.

Figure 1:
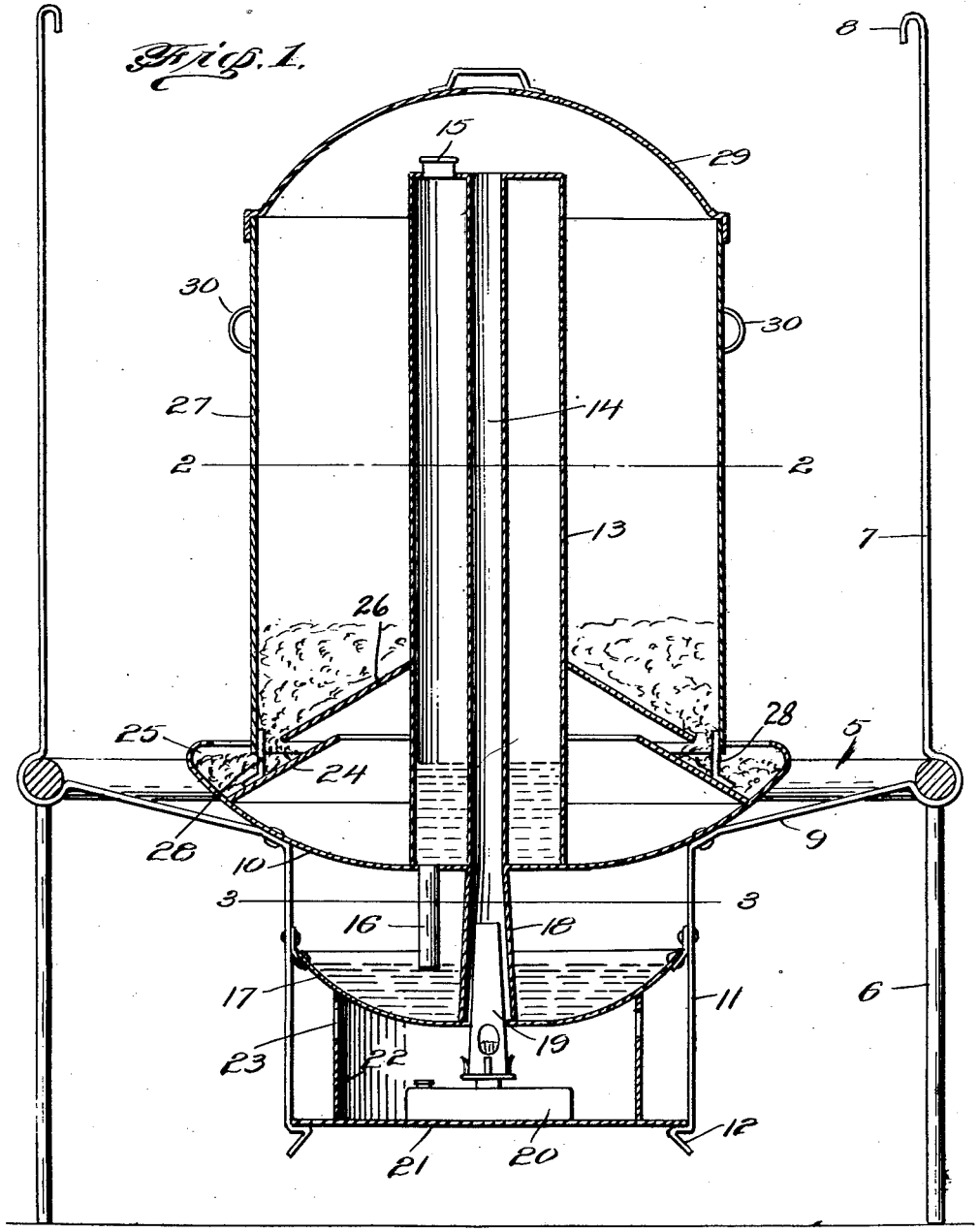

In the drawings forming a part of this application and in which like numerals designate like parts throughout the same:
Figure 1 is a detail vertical section of my combined feeder and waterer.

Figure 2:
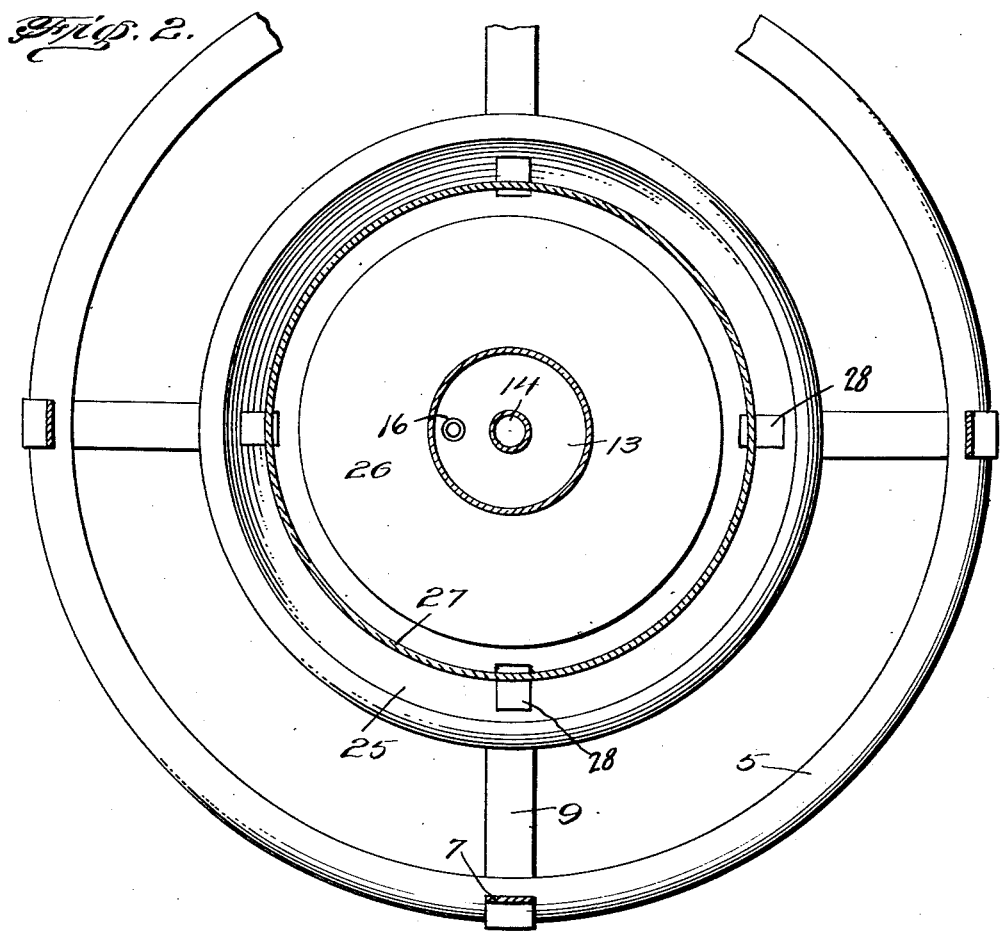
Figure 3:
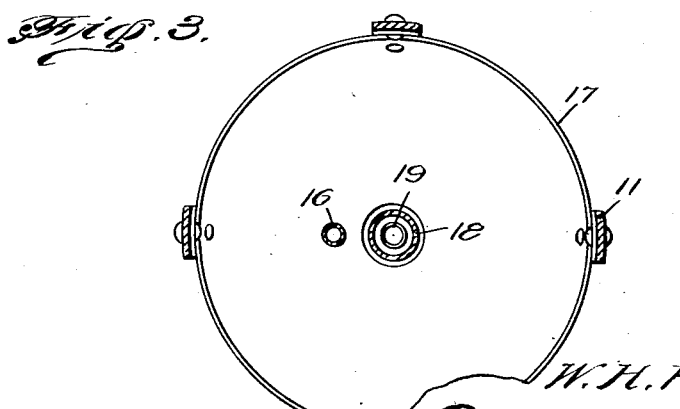

Figure 2 is a detail longitudinal section taken substantially upon the line 2—2 of Figure 1, and Figure 3 is a similar view taken upon the line 3—3 of the same figure.

Now having particular reference to the drawing, my novel feeder and waterer includes a supporting means consisting of a circular ring roost 5 that is equipped with a plurality of pendent legs 6 in order that the same may be supported horizontally above the floor surface or other support.

Associated with said ring roost at spaced points thereon are the lower ends of vertically extending hanger rods 7 that are hooked at their upper ends as at 8 in order that the same may be engaged with rafters or other supporting means within the hen house.
Extending inwardly from the lower ends of said hanger arms 7 are bars 9 that are connected at their inner ends to a pan shaped trough 10, while formed upon the inner end of said bars are pendent legs 11, the inner ends of which are formed with latch hooks 12 for a purpose hereinafter more fully described.

Resting upon the center of said trough 10 is a vertically extending cylindrical water container 13 extending through the central portion of which is an air flue 14. The upper end of this water container is provided with a filler neck 15, while the bottom wall thereof is provided with a discharge pipe 16 that extends through an opening in the trough 10, and is adapted to convey the water from the container into a water pan 17 secured to and within the before mentioned legs 11, it being obvious that a barometric feed for the water is provided in view of said discharge pipe 16.

Directly beneath the flue 14 of the water container 13 said trough 10 is provided with an opening, extending downwardly from which is a flue pipe 18 that rests at its lower end in the bottom of the pan 17 and over an opening provided in said pan 17 in order that a chimney 19 of an oil heater 20 may extend into said flue with the end in view of allowing the heat to pass upwardly through the flue 14 and consequently maintaining the water, within the container, warm.

The burner 20 is supported upon a circular plate 21, that is retained within the legs 11 through the medium of said latch hooks 12, Figure 1. Said plate is provided upon its top side with a cylindrical skirt 22 that surrounds the burner to prevent the heat therefrom from passing outwardly between the plate and pan 21 and 17 respectively, air inlet holes 23 being provided at the upper edge of the skirt for obvious purposes.

The pan shaped trough 10 is provided interiorly with an inclined false bottom wall 24 for providing a feed trough 25 between itself and the inwardly curved upper edge of the trough, as clearly shown in Figure 1. This false bottom wall 24 is open at its center for allowing the water container 13 to pass upwardly therethrough, said container being provided at a point directly above said false wall with a downwardly inclined skirt 26, the outer edge of which overlaps the inner edge of the false wall as clearly shown in Figure 1.

Adapted to be disposed over the water container 13 is a relatively large cylindrical shaped feed tank 27 open at its lower end, the lower open end thereof being provided with a suitable number of supporting legs 28 that rest upon the false wall 24 of the feed trough 10 for maintaining the lower open end of the tank in slightly spaced relation with said false wall, said feed tank however being of such length as to permit of the engagement of the lower end of the tank within the trough provided between the false wall 24 and said inwardly bent end of the pan 10, it being also appreciated that such a construction will permit of the gravity feed of the mash or other food from the tank into said trough 25.

A suitable lid 29 is provided for the upper open end of the tank while said tank is equipped with one or more carrying handles 30.

It will thus be seen that I have provided a highly novel, simple, and efficient form of combined feeder and waterer for poultry that is equipped to receive a large supply of feed and water, and that may be readily knocked down for transportation or storage purposes, and wherein both the feed and water may be maintained in a warm condition during the cold months, means being also provided whereby the device may be supported above the ground or floor surface as well as hung from a rafter, or other supporting bars within the hen house.

Minor changes may be made in the invention without departing from the spirit and scope of the appended claims.

Having thus described the invention, what I claim as new and desire to secure by Letters Patent is:—

1. In a combined feeder and waterer for poultry, a circular chicken roost member, a pan supported within the circular roost member, the interior thereof being formed at its outer edge portion with a feed receiving trough, a feed tank open at its lower end and extending into said trough, the lower edge of said feed tank being spaced from the bottom of the trough, a water container supported upon said pan and extending vertically within said feed tank, said water container being provided with a water outlet, and means whereby the water within the container may be heated.

2. In a combined feeder and waterer for poultry, a circular chicken roost member, a pan supported within said circular roost member, the interior thereof being formed at its outer edge portion with a feed receiving trough, a feed tank open at its lower end, and extending downwardly into said trough, and being spaced slightly from the bottom of the trough, a water container supported upon said pan and extending vertically within said tank, said container being provided with a water outlet, means whereby the water within the container may be heated, and a water receiving pan supported beneath the first mentioned pan, and within which the water from the container is to be discharged.

3. In a combined feeder and waterer for poultry, a circular chicken roost member, a pan supported within said circular roost member, the interior thereof being formed at its outer edge portion with a feed receiving trough, a feed tank open at its lower end, and extending downwardly into the feed trough, it being spaced from the bottom thereof, a water container suported on the pan and extending vertically within said tank, said container being provided with a water outlet, a water receiving pan supported beneath the first mentioned pan and within which the water from the container is to be discharged, and a removable heat producing means detachably supported beneath said water pan.

4. In a combined feeder and waterer for poultry, a circular chicken roost member, a pan supported within said circular roost member, the interior thereof being formed at its outer edge portion with a feed receiving trough, a feed tank open at its lower end, and extending downwardly into the feed trough, it being spaced from the bottom thereof, a water container supported on the pan and extending vertically within said tank, said container being provided with a water outlet, a water receiving pan supported beneath the first mentioned pan and within which the water from the container is to be discharged, a removable heat producing means detachably supported beneath said water pan, and a heat conducting flue arranged between said pans.

5. In a combined feeder and waterer for poultry, a circular chicken roost member, a pan supported within said circular roost member, an inclined false bottom arranged in said pan to provide a feed trough at the outer edge portion of the pan, a feed tank open at its lower end, the lower end of said tank extending downwardly into the feed trough and being slightly spaced from said inclined false bottom, a water container supported upon said pan and extending vertically within said tank, a downwardly inclined skirt portion encircling the lower portion of said water tank, the outer edge of said skirt portion extending over the inner edge of the inclined false bottom, and a water outlet associated with said water container.

In testimony whereof I affix my signature.

WILLIAM H. ROBISON.